United States Patent [19]

Tatemoto

[11] Patent Number: 5,198,502

[45] Date of Patent: Mar. 30, 1993

[54] THERMOPLASTIC ELASTOMER COMPOSITION, METHOD FOR MOLDING THE SAME AND MOLDED ARTICLE OF THE SAME

[75] Inventor: Masayoshi Tatemoto, Osaka, Japan

[73] Assignee: Daikin Industries Ltd., Osaka, Japan

[21] Appl. No.: 866,214

[22] Filed: Apr. 9, 1992

Related U.S. Application Data

[63] Continuation of Ser. No. 529,569, May 29, 1990, abandoned.

[30] Foreign Application Priority Data

May 29, 1989 [JP] Japan ................................ 1-136383

[51] Int. Cl.$^5$ .................. C08F 259/08; C08F 297/04; C08F 297/08; C08J 3/24
[52] U.S. Cl. .................................. 525/276; 525/316; 525/322; 525/323; 525/941; 525/194; 525/198; 525/199
[58] Field of Search ................. 525/276, 316, 323, 941

[56] References Cited

U.S. PATENT DOCUMENTS

| | | | |
|---|---|---|---|
| 3,929,934 | 12/1975 | Moore et al. | 525/276 |
| 4,094,949 | 6/1978 | Yokokawa et al. | 264/234 |
| 4,472,557 | 9/1984 | Kawashima et al. | 525/276 |
| 4,487,882 | 12/1984 | Ueta et al. | 525/276 |
| 4,530,970 | 7/1985 | Morozumu et al. | 525/193 |
| 4,603,175 | 7/1986 | Kawachi et al. | 525/276 |
| 4,722,973 | 2/1988 | Yamaoka et al. | 525/240 |
| 4,935,467 | 6/1990 | Cheng et al. | 525/199 |
| 5,028,663 | 7/1991 | Chung | 525/198 |
| 5,057,345 | 10/1991 | Barrett | 525/193 |

FOREIGN PATENT DOCUMENTS 2293448 7/1976 France .
61-211358 9/1986 Japan .

*Primary Examiner*—Carman J. Seccuro, Jr.
*Attorney, Agent, or Firm*—Birch, Stewart, Kolasch & Birch

[57] ABSTRACT

A thermoplastic elastomer composition comprising a thermoplastic elastomeric block or graft polymer comprising at least one hard segment and at least one soft segment and a vulcanizing agent, which can be molded under high shearing stress at a temperature lower than a melting or softening point of the hard sements under shear force to give a molded article having a substantially smooth surface.

12 Claims, 1 Drawing Sheet

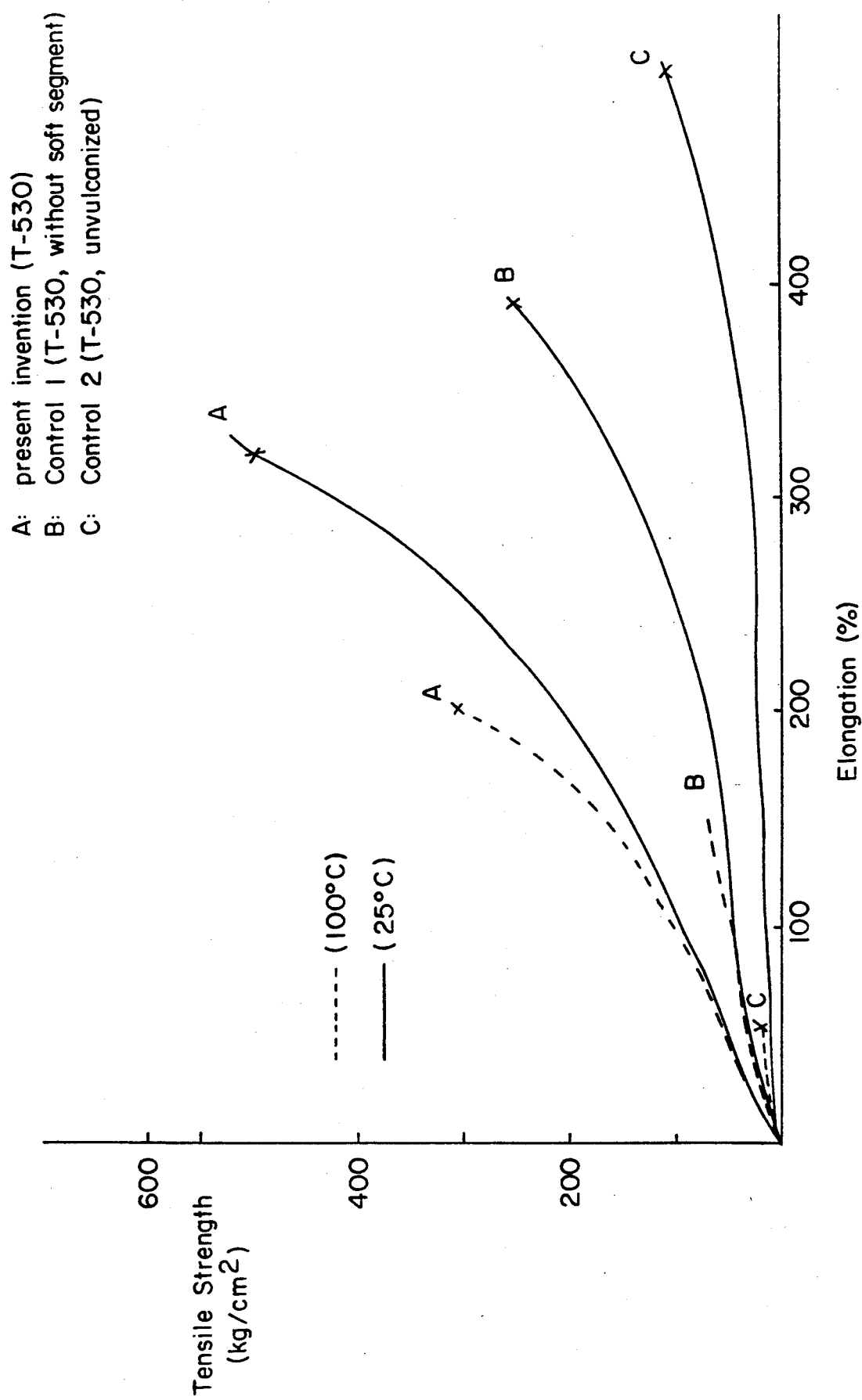

THERMOPLASTIC ELASTOMER COMPOSITION, METHOD FOR MOLDING THE SAME AND MOLDED ARTICLE OF THE SAME

This application is a continuation of application Ser. No. 529,569, filed on May 29, 1990, now abandoned, the entire contents of which are hereby incorporated by reference.

BACKGROUND OF THE INVENTION

1. Field of the Invention

The present invention relates to a thermoplastic elastomer composition, a method for molding the same and a molded article of the same. More particularly, the present invention relates to a moldable thermoplastic elastomer composition comprising a thermoplastic elastomeric block or graft polymer.

2. Description of the Related Art

Thermoplastic elastomers have been increasingly used as elastomers which can be molded in a similar way to general thermoplastic resins and require no vulcanization. However, since cross linkage by vulcanization are not through chemical bonds but by physical forces, they are insufficient in heat resistance such as brittleness and an excess residual strain under high pressure at high temperature.

It might be possible to improve such drawbacks by designing such polymers so as to be vulcanizable during molding processes. However, one of inherent characteristics of the thermoplastic elastomers, namely reusability of scraps or defective molded articles is sacrificed, which makes these improvement insignificant.

SUMMARY OF THE INVENTION

One object of the present invention is to provide a thermoplastic elastomer composition comprising a thermoplastic elastomeric block or graft polymer composed of at least one hard segment and at least one soft segment and a vulcanizing agent, which composition can be molded at a temperature lower than its melting or softening point by a novel process and post curing by heat.

Another object of the present invention is to provide a method for producing a molded article comprising treating the thermoplastic elastomer composition of the present invention under a high shearing stress at a temperature lower than a melting or softening point of the hard segment to mold an article and vulcanizing the molded article at a vulcanizing temperature under atmospheric pressure to cross-link the composition to produce the molded article having a substantially smooth surface, heat resistance in brittleness and a less residual strain under high pressure.

According to a first aspect of the present invention, there is provided a thermoplastic elastomer composition comprising a thermoplastic elastomeric block or graft polymer composed of at least one hard segment and at least one soft segment and a vulcanizing agent, which composition is to be treated under a high shearing stress at a temperature lower than a melting or softening point of the hard segment to produce a molded article having a substantially smooth surface.

According to a second aspect of the present invention, there is provided a method for molding a thermoplastic elastomer composition comprising a thermoplastic elastomeric block or graft polymer composed of at least one hard segment and at least one soft segment and a vulcanizing agent, which method comprises treating said composition under a high shearing stress at a temperature lower than a melting or softening point of the hard segments to obtain a molded article having a smooth surface.

BRIEF DESCRIPTION OF THE DRAWING

Figure shows the results of tensile strength-elongation test of the present invention and controls at 25° C. and 100° C.

DETAILED DESCRIPTION OF THE INVENTION

In the specification and claims, the term "shearing stress" is intended to mean a force generated on a surface between the compound and a contacting area thereof in a molding die.

The thermoplastic elastomer to be used according to the present invention may be any of the conventional ones. Examples of the thermoplastic elastomer are block or graft polymers of hydrocarbons or fluorocarbons. Typical examples of the hydrocarbon polymers include styrene/butadiene/styrene block polymer, polypropylene/poly(ethylene-propylene)/polypropylene block polymer and the like.

Examples of the fluorine-containing thermoplastic elastomer include typically an elastomer comprising:

at least one soft segment composed of a terpolymer of vinylidene fluoride/hexafluoropropylene/tetrafluoroethylene or a terpolymer of vinylidene fluoride/chlorotrifluoroethylene/tetrafluoroethylene and at least one hard segment composed of a copolymer of tetrafluoroethylene/ethylene or chlorotrifluoroethylene/ethylene or polyvinylidene fluoride;

an elastomer comprising;

at least one soft segment composed of a copolymer of tetrafluoroethylene/propylene and at least one hard segment composed of a copolymer of tetrafluoroethylene/ethylene; and an elastomer comprising:

at least one soft segment composed of an amorphous rubbery copolymer of tetrafluoroethylene/perfluoroalkyl vinyl ether and at least one hard segment composed of the same copolymer of tetrafluoroethylene/perfluoroalkyl vinyl ether provided that the content of perfluoroalkyl vinyl ether is less than that in the soft segment.

In the present invention, a fluorine-containing thermoplastic elastomer is preferably used and may be prepared by a process described in U.S. Pat. No. 4,158,678 the disclosure of which is hereby incorporated by reference.

A vulcanizing agent, namely a cross linking agent or cross linking aid, is selected according to nature of the thermoplastic elastomer. Preferably, the vulcanizing agents are those which can selectively cross link the hard segment rather than the soft segment. The conventional vulcanizing agents for the fluorine-containing thermoplastic elastomer may be used. Preferable vulcanizing agents are those disclosed in U.S. Pat. No. 4,243,770 the disclosure of which is hereby incorporated by reference. Among these agents organic peroxides and polyols are preferred.

The thermoplastic elastomer and the vulcanizing agent may be compounded by a rubber mill or a kneader conventionally used in the art. The compounding should be carried out at a temperature of at least by 50°

C. lower than a vulcanizing temperature at which the cross linking reaction may be induced.

The amounts of the vulcanizing agent, or the cross linking agent and the optional cross linking aid are not critical and depend on the selected thermoplastic elastomer and desired properties of the cross linked article. The desirable amount of vulcanizing agent in the present invention is in the same range as that generally employed in the conventional elastomer. Usually, the amount of vulcanizing agent may be from 0.01 to 10 parts by weight, preferably from 0.5 to 4 parts by weight per 100 parts by weight of the thermoplastic elastomer.

The thermoplastic elastomer composition of the present invention may contain conventional fillers such as carbon and while carbon or plasticizers in an amount of up to several ten parts by eight per 100 parts by weight of the thermoplastic elastomer with no problem.

The thermoplastic elastomer composition of the present invention can be easily pre-molded by utilizing its unique molding property in any form such as granules, pellets and the like to make handling easy.

The thermoplastic elastomer composition of the present invention is treated under high shearing stress preferably by extrusion molding processing. It can also be treated by other molding methods such as injection molding, transfer molding and calendering whereby the same shearing stressed molding conditions as in extrusion can be achieved.

The present invention is characterized in that the molding of the thermoplastic elastomer composition can be carried out at a temperature lower than the melting or softening point of the thermoplastic elastomer. The desirable temperature is lower than a vulcanizing temperature. The molding temperature is preferably lower by at least 30° C. than the vulcanizing temperature and in the range preferably from 60 to 130° C., more preferably from 90 to 120° C.

In the molding of the thermoplastic elastomer composition of the present invention, no melt fracture is surprisingly observed even though the molding pressure is as extremely high as to be abnormal in the conventional molding method.

The molding pressure is expressed in terms of a shearing stress as described above, and expressed in the unit of $kg/cm^2$ which is determined by indication of a pressure sensor attached in a ram extruder.

Further, the molding speed of the bar which comes out a die outlet is expressed in the unit of m/min. and is determined by a ratio of a sectional area of the die outlet to that of the cylinder and the speed of the ram through into the cylinder.

Preferably shearing stress is from 100 to 1000 $kg/cm^2$, more preferably from 200 to 500 $kg/cm^2$.

The shearing stress is measured by using a cylinder having a sectional area of 1 $cm^2$, an die having an outlet diameter of 1 mm and a pressure sensor attached to a ram extruder.

Also, the molding speed is determined by the speed of the ram. Therefore, the molding of the present invention can be extruded, for example, at 2 to 200 m/min. preferably from 5 to 200 m/min. The molding speed of the bar coming out the die is, for example, 64 m/min. under about 250 $kg/cm^2$ and at 500 mm/min. of ram speed at 110° C. under the above conditions.

When the composition of the present invention is molded under lower extrusion pressure than the above shearing stress range, the molded article generates melt fracture and voids, which is in contrast to the prior art melt extrusion process of the conventional materials. Employment of the extrusion pressure higher than the above upper limit results in deformation such as melt fracture.

In general, since the molding pressure also depends on a molding machine, a shape of a die, a cross sectional area of the extruded article and the like, an operating pressure should be selected by taking these conditions into consideration.

The continuously extruded article under a suitable molding pressure may be a tube, a string with various sectional shapes, a fiber, a sheet, a film or a rod.

The molded article may be vulcanized directly or after being wound up. When a high speed vulcanizing system is used, the vulcanization can be completed in the order of seconds depending on a temperature, a thickness of the article, and a desired degree of vulcanization.

In general, when the molded article of thermoplastic resin is vulcanized, care should be taken to prevent deformation such as foaming or shrinkage. However, in the present invention, such defects are not observed since the thermoplastic elastomer is treated at a temperature below its melting or softening point.

The vulcanization of the molded article of the present invention can be effected by only heating it at a temperature range of from 140 to 200° C., preferably from 150 to 180° C., preferably in an inert gas atmosphere, for example, a nitrogen gas to prevent the exposure of the article to the air, for a period of 0.01 to 30 minutes. This is because the vulcanization reaction is proceeded through an addition reaction directed to the saturated bonds via free radicals.

One of the processes which practically meet with those conditions includes a heating process in a fluorinated or silicone oil bath which avoids the contact with the air.

The molding method of thermoplastic elastomer composition of the present invention is a novel method which resembles to cold working of metals or some resins rather than a known method which utilizes flowability of thermoplastic resins at a melting point. When the thermoplastic elastomer is molded under cold working conditions in the absence of the vulcanizing agent, granulated elastomer will be produced and a continuous molded article can be hardly produced. Addition of a material which act as a plasticizer would not make it easy to mold the thermoplastic elastomer.

The molding of thermoplastic elastomer composition of the present invention has following characteristics:

1. It can be carried out at a much higher rate than conventional melt extrusion of thermoplastic resins.
2. It does not show die swell which occurs in the conventional melt processing.
3. The molded article has less residual molding strain.
4. After molding, the molding article can be cross linked by simply heating it up to a temperature at which the vulcanizing agent functions.
5. The composition which has not been vulcanized is mixed again with a raw material for molding. Then, the scraps and the defective moldings can be reused.
6. The molded article is hardly deformed during vulcanizing process. In addition, the cross linked molded article shows no or little deformation such as shrinkage when heated to a temperature higher than the melting point of the thermoplastic elastomer composition.

7. The molded articles of the present invention do not cause blocking, the conventional melt processed articles tend to cause blocking.

Thus, the present invention greatly improves the moldability of thermoplastic elastomer without sacrificing reusability of the thermoplastic elastomer. In addition, defects of the conventional molded articles such as brittleness at high temperature or blocking can be overcome.

PREFERRED EMBODIMENTS OF THE INVENTION

The present invention will be illustrated by following Examples, in which "parts" are by weight unless otherwise indicated, and the abbreviations have the following significances:
TFE: tetrafluoroethylene
E: ethylene
HFP: hexafluoropropylene
VdF: vinylidene fluoride.

EXAMPLE 1

A fluorine-containing thermoplastic elastomer (Dai-el (trade mark) Thermoplastic T-530 manufactured by Daikin Industries, Ltd., a fluorine-containing polymer comprising fluorine-containing hard segments (monomer composition: TFE/E/HFP =49/43/8 by mole) and fluorine-containing soft segments (monomer composition: VdF/HFP/TFE =50/30/20 in mole and the weight ratio of the hard segment to the soft segment =15:85) (50 g) was kneaded on a 4 inch rubber mill at 90° C. to be wound around a roll in a sheet form. Thereafter, triallyisocyanurate (1.5 g) and then 2,5-dimethy-2,5-di(tert.-butyroxy)hexene-3 (1.8 g) were successively compounded to obtain a homogeneous milky white compound. The obtained compound (20 g) was loaded in a cylinder having a sectional area of 1 cm² of Capirograph (manufactured by Toyo Seiki Co., Ltd.) and extruded at 110° C. through a die having an inner diameter of 1 mm and a length of 5 mm.

A ram extrusion speed of less than 10 mm/min. led to a variable shape of the extruded bar having a roughened surface and voids and fluctuated diameter. At a ram extrusion speed of 500 mm/min., the extrusion was stabilized so that the molded bar had a substantially smooth surface and good shape and its diameter corresponded to the inner diameter of the die.

The extruded bar was dipped in an oil bath of perfluoropolyether (Demnam (trade mark) manufacture by Daikin Industries, Ltd.) kept at 180° C. for 10 minutes in a nitrogen atmosphere to vulcanize it. The vulcanized bar shrank only by 2% in the longitudinal direction and was colorless and transparent. Also, control samples were prepared and tested in the same manner as above except that the control 1 did not contain a hard segment in the thermoplastic elastomer and the control 2 was not subjected to vulcanization after molding.

The results in the strength-elongation test are compared in Figure.

The article of the present invention had good strength at high temperature (100° C.) and better toughness at high temperature than the conventional vulcanized fluorine-containing elastomer as seen from Figure.

EXAMPLE 2

In the same manner as in Example 1 but using a die with an circular slit having an inner diameter of 1 mm, an outer diameter of 2 mm and a length of 5 mm, a tube was produced. Since the center of the circular slit slightly deviated from the center of the die, the produced tube was a spiral one. After cross linking, the tube was not deformed. This means that the spiral tube was also conveniently produced.

EXAMPLE 3

In the same manner as in Example 1 but using a fluorine-containing thermoplastic elastomer (Dai-el (trade mark) Thermoplastic T-630 manufactured by Daikin Industries, Ltd., a fluorine-containing polymer comprising fluorinecontaining hard segments (monomer composition: VdF) and fluorine-containing soft segments (monomer composition: VdF/HFP/TFE =about 50/30/20 by mole) a bar was produced.

The bar shrank by about 10 % during vulcanization at 180° C. The tensile strength at 25° C. was 210 kg/cm² at 800% elongation, while vulcanized Dai-el T-630 has original tensile strength of 40 kg/cm² at 450% elongation.

EXAMPLE 4

In the same manner as in Example 1, Dai-el Thermoplastic T-630 (100 parts), magnesium oxide (5 parts), calcium hydroxide (3 parts), bisphenol-AF (2 parts), 8-benzyl-1,8-diaza-bicylco[5.4.0]-7-undecenium chloride (DBUB) (0.35 part) and MT-thermal carbon (10 parts) were kneaded and formed in a sheet. The sheet was cut to prepare pellets. In the same manner as in Example 1, the pellets were extruded with Capirograph at 95° C. At a ram extrusion speed higher than 20 mm/min., a bar having a stable shape was produced.

The bar was dipped in a silicone oil bath kept at 180° C. for one minute. Thereby, the cross linked bar shrank by about 10% in the longitudinal direction, but it had a substantially smooth surface and no foam therein.

The cross linked bar was subjected to tensile tests at a pulling rate of 100 mm/min to determine tensile strength to be 185 kg/cm² at 270% elongation.

EXAMPLE 5

In the same manner as in Example 1 but using Daiel Thermoplastic T-230X (manufactured by Daikin Industries, Ltd., a fluorine-containing thermoplastic elastomer (monomer composition of the soft segment: VdF/HFP =78/22 by mole; monomer composition of the hard segment: TFE/E/HFP =49/43/8), which is similar to Dai-el T-530 except that, because the soft segments consist of a polymer having a glass transition temperature of −19° C., the polymer has better low temperature properties), a bar was produced. The produced bar had the same good quality as that in Example 1.

The bar was vulcanized at 180° C. to obtain the cross linked bar as a was colorless and transparent material.

What is claimed is:

1. A method for molding a thermoplastic elastomer composition comprising a thermoplastic elastomeric block or graft polymer of hydrocarbons or fluorocarbons composed of at least one hard segment and at least one soft segment and a vulcanizing agent, which method comprises treating sad composition under a high shearing stress of from 100 to 1000 kg/cm² at a temperature lower than a melting or softening point of the hard segments to obtain a molded article having a smooth surface.

2. The method according to claim 1, which further comprises vulcanizing the molded article.

3. The method according to claim 1, wherein the thermoplastic elastomer is a fluorine-containing or a hydrocarbon elastomeric block polymer.

4. The method according to claim 1, wherein the thermoplastic elastomer is selected from a styrene-/butadiene/styrene block polymer or a polypropylene-/poly(ethylene-propylene)/polypropylene block polymer.

5. The method according to claim 1, wherein the hard segment is selected from a copolymer of tetrafluoroethylene/ethylene, a copolymer of chlorotrifluoroethylene/ethylene, or polyvinylidene fluoride.

6. The method according to claim 1, wherein the soft segment is selected from a terpolymer of vinylidene fluoride/hexafluoropropylene/tetrafluoroethylene, a terpolymer of vinylidenefluoride/chlorotrifluoroethyleen/tetrafluoroethylene or copolymer of tetrafluoroethylene/propylene.

7. The method according to claim 1, wherein the soft segment is an amorphous rubbery copolymer of tetrafluoroethylene/perfluoroalkyl vinyl ether.

8. The method according to claim 7, wherein the hard segment is a copolymer of tetrafluoroethylene/perfluoroalkyl vinyl ether, in which the content of said ether is less than the content of the ether contained in the soft segment.

9. The method according to claim 1, wherein the amount of said vulcanizing agent is from 0.01 to 10 parts by weight per 100 parts by weight of the thermoplastic elastomeric block or graft polymer.

10. The method according to claim 1, wherein the amount of said vulcanizing agent is from 0.5 to 4 parts by weight per 100 parts by weight of the thermoplastic elastomeric block or graft polymer.

11. The method according to claim 1, wherein said vulcanizing agent is an organic peroxide.

12. The method according to claim 1, which further comprises vulcanizing said molded article at a temperature of 140 to 200° C.

* * * * *